US012697516B2

(12) United States Patent
Skoskiewicz

(10) Patent No.: US 12,697,516 B2
(45) Date of Patent: Aug. 4, 2026

(54) SPRINKLER MANIFOLD FOR ENERGY STORAGE SYSTEMS

(71) Applicant: STEM, INC., Milbrae, CA (US)

(72) Inventor: Andrzej Skoskiewicz, Menlo Park, CA (US)

(73) Assignee: STEM, INC., Millbrae, CA (US)

( * ) Notice: Subject to any disclaimer, the term of this patent is extended or adjusted under 35 U.S.C. 154(b) by 66 days.

(21) Appl. No.: 17/023,245

(22) Filed: Sep. 16, 2020

(65) Prior Publication Data

US 2021/0077842 A1    Mar. 18, 2021

Related U.S. Application Data

(60) Provisional application No. 62/901,734, filed on Sep. 17, 2019.

(51) Int. Cl.
*A62C 3/16*        (2006.01)
*A62C 37/08*        (2006.01)
*H01M 10/42*        (2006.01)

(52) U.S. Cl.
CPC ................ *A62C 3/16* (2013.01); *A62C 37/08* (2013.01); *H01M 10/4207* (2013.01); *H01M 10/4235* (2013.01); *H01M 2200/10* (2013.01)

(58) Field of Classification Search
None
See application file for complete search history.

(56) References Cited

U.S. PATENT DOCUMENTS

| | | | |
|---|---|---|---|
| 9,180,326 B2 | 11/2015 | Van Schoor et al. | |
| 2011/0000801 A1* | 1/2011 | Hirakawa ................ | A62C 3/07 206/223 |
| 2014/0186668 A1* | 7/2014 | Jung ................... | H01M 10/613 429/61 |
| 2017/0043194 A1* | 2/2017 | Ling ................... | H01M 10/486 |
| 2017/0256831 A1* | 9/2017 | Hong ................... | H01M 10/63 |
| 2017/0303445 A1* | 10/2017 | Robert ............... | H05K 7/20872 |
| 2018/0048037 A1* | 2/2018 | Newman .............. | H01M 10/63 |
| 2019/0319234 A1* | 10/2019 | Cordani ............... | H01M 10/66 |

(Continued)

FOREIGN PATENT DOCUMENTS

| | | | | |
|---|---|---|---|---|
| CN | 108853848 | * | 11/2018 | ............... A62C 3/16 |
| CN | 110101993 | * | 8/2019 | ........ H01M 10/6567 |
| CN | 110496334 | * | 11/2019 | ............... A62C 3/16 |

(Continued)

OTHER PUBLICATIONS

Google-define definition of "integrated" (copy provided, definition accessed May 17, 2022). (Year: 2022).*

(Continued)

*Primary Examiner* — Amanda J Barrow
(74) *Attorney, Agent, or Firm* — Artegis Law Group, LLP

(57)        ABSTRACT

A battery rack for an energy storage system uses a manifold pipe and fluid discharge terminals to deliver water into the battery rack. The manifold pipe directs water flowing from a water source to fluid discharge terminals, which are heat-activated. Fluid discharge terminals may be coupled to branch pipes, which are in turn coupled to the manifold pipe. A heat-activated fluid discharge terminal discharges the water flowing from the manifold pipe to or within a battery module when activated at a threshold temperature range.

8 Claims, 6 Drawing Sheets

(56) References Cited

U.S. PATENT DOCUMENTS

| 2019/0334143 | A1 | * | 10/2019 | Sugeno | ............... | H01M 50/276 |
|---|---|---|---|---|---|---|
| 2022/0249891 | A1 | * | 8/2022 | Jo | ............................ | A62C 3/16 |

FOREIGN PATENT DOCUMENTS

| CN | 110772732 | | * | 2/2020 | ............... | A62C 3/16 |
|---|---|---|---|---|---|---|
| JP | 2012-085749 | | * | 5/2012 | ............. | A62C 35/68 |
| JP | 2018-063765 | | * | 4/2018 | ............ | H01M 10/42 |
| KR | 102154314 | B1 | * | 9/2020 | ............... | A62C 3/16 |
| WO | WO 2014/023485 | | * | 2/2014 | ............... | A62C 3/07 |
| WO | WO 2018/233955 | | * | 12/2018 | ............ | H01M 10/65 |
| WO | WO 2019/139293 | | * | 7/2019 | .............. | H01M 4/04 |

OTHER PUBLICATIONS

Quick Response Fire Supply, "#10—How a Fire Sprinkler Works: Thermal Sensitivity," Feb. 14, 2013, 10 pages. https://blog.qrfs.com/10-how-a-fire-sprinkler-works-thermal-sensitivity/.

Quick Response Fire Supply, "#303—What Causes a Fire Sprinkler to Activate?," Dec. 3, 2019, 10 pages. https://blog.qrfs.com/303-what-causes-a-fire-sprinkler-to-activate/.

Valerie Ziavras, "The Basics of Sprinkler Thermal Characteristics," National Fire Protection Association, Jun. 22, 2021, 8 pages. https://www.nfpa.org/News-and-Research/Publications-and-media/Blogs-Landing-Page/NFPA-Today/Blog-Posts/2021/06/22/The-Basics-of-Sprinkler-Thermal-Characteristics.

* cited by examiner

SPRINKLER MANIFOLD FOR ENERGY STORAGE SYSTEMS

CROSS-REFERENCE TO RELATED APPLICATIONS

This application claims the benefit of U.S. Provisional Application No. 62/901,734, titled "SPRINKLER MANIFOLD," filed Sep. 17, 2019. The subject matter of this related application is hereby incorporated herein by reference in its entirety.

BACKGROUND

Field of the Various Embodiments

The disclosed embodiments relate generally to energy storage systems and, more specifically, to a sprinkler manifold for energy storage systems.

Description of the Related Art

In renewable energy systems, particularly solar or wind energy systems, periods of low or no energy generation due to low solar or wind availability is reasonably common. In order to support power requirements and ensure reliable energy supply during such periods, energy storage systems, including battery energy storage systems, can be deployed on the electric grid.

Energy storage systems typically incorporate battery cells (e.g., lithium ion battery cells) that are assembled into one or more battery modules. Multiple different battery modules may be arranged together to form a battery rack, which may be held in a housing or cabinet. When such battery cells, modules and/or battery racks are abused or exposed to an external source of high temperature (e.g., fire), the battery cells, modules and/or battery rack can enter into a condition known as "thermal runaway" and ignite, thereby causing a fire. Such fires are difficult to extinguish because the ignited battery cell(s) can generate a substantial amount of additional heat which can initiate a thermal runaway condition in adjacent cell(s), creating a cascading event. Furthermore, such fires may generate their own oxygen, and thus oxygen starvation is not an effective way of suppressing a thermal runaway event and the resulting fire. Accordingly, the most effective way to extinguish a fire resulting from thermal runaway is to lower the temperature to mitigate or suppress the thermal runaway condition. Water, due to its high specific heat, has been found to be effective in absorbing large amounts of energy and reducing temperatures sufficiently to interrupt and stop thermal runaway events that occur with battery cells, modules and/or battery racks and extinguish the associated fires.

When an energy storage system with one or more battery racks is implemented indoors, overhead fire sprinklers are typically used to deliver water to the energy storage system in the event of a fire. A drawback of overhead fire sprinklers is that such systems are usually ineffective in delivering water directly to the affected areas of a battery module or battery rack. Among other things, an overhead fire sprinkler cannot directly deliver water to the interior of the cabinet housing the battery module or battery rack. Another drawback is that overhead fire sprinklers are normally heat-activated; thus, the thermal runaway event is likely to be well underway by the time an overhead file sprinkler is activated, which makes extinguishing the associated fire all the more difficult.

In response to the various limitations of overhead fire sprinklers with respect to energy storage systems, regulators have begun demanding that additional safety measures be put in place when implementing energy storage systems. Such additional measures include, without limitation, increasing spacing between battery cabinets to limit fire propagation, increasing sprinkler head density and increasing the sprinkler flow rate to a level that can flood the battery modules and/or battery racks housed within the energy storage system. These additional measures are undesirable because they can require extensive upgrades (e.g., upgrades to piping in buildings in which energy storage systems are implemented), which can substantially increase costs and implementation times and can involve one or more various government regulators.

As the foregoing illustrates, what is needed are more effective ways to deliver water to an affected area of an energy storage system in the event of a thermal runaway condition or fire.

SUMMARY

Embodiments of the present disclosure include a system that includes a housing configured to mount one or more battery modules in an interior of the housing, a manifold pipe, and a fluid discharge terminal coupled to the manifold pipe, wherein the fluid discharge terminal is configured to receive fluid flowing from the manifold pipe and discharge fluid to a first mounting location in the interior of the housing.

Embodiments of the present disclosure may further include an energy storage apparatus that includes a housing configured to mount one or more battery modules in an interior of the housing, a battery module mounted in the interior of the housing, a manifold pipe extending into the interior of the housing, and a fluid discharge terminal coupled to the manifold pipe and configured to discharge fluid flowing from the manifold pipe to the battery module.

A technical advantage of the disclosed design is that the disclosed design can deliver water directly to battery modules mounted within a battery rack. Accordingly, the disclosed techniques and systems are more effective at extinguishing fires occurring at battery modules within a battery rack compared to conventional techniques. Another technical advantage of the disclosed design is that the disclosed design places heat-activated sprinkler heads closer to the battery modules that can emit heat when under thermal runaway. Accordingly, the sprinkler heads activate earlier in the evolution of the fire, thereby requiring less water flow for effective fire suppression. A further technical advantage of the disclosed design is that the disclosed design reduces collateral damage to the remainder of the battery modules, battery racks, power conversion hardware, and the facility due to water or smoke damage.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
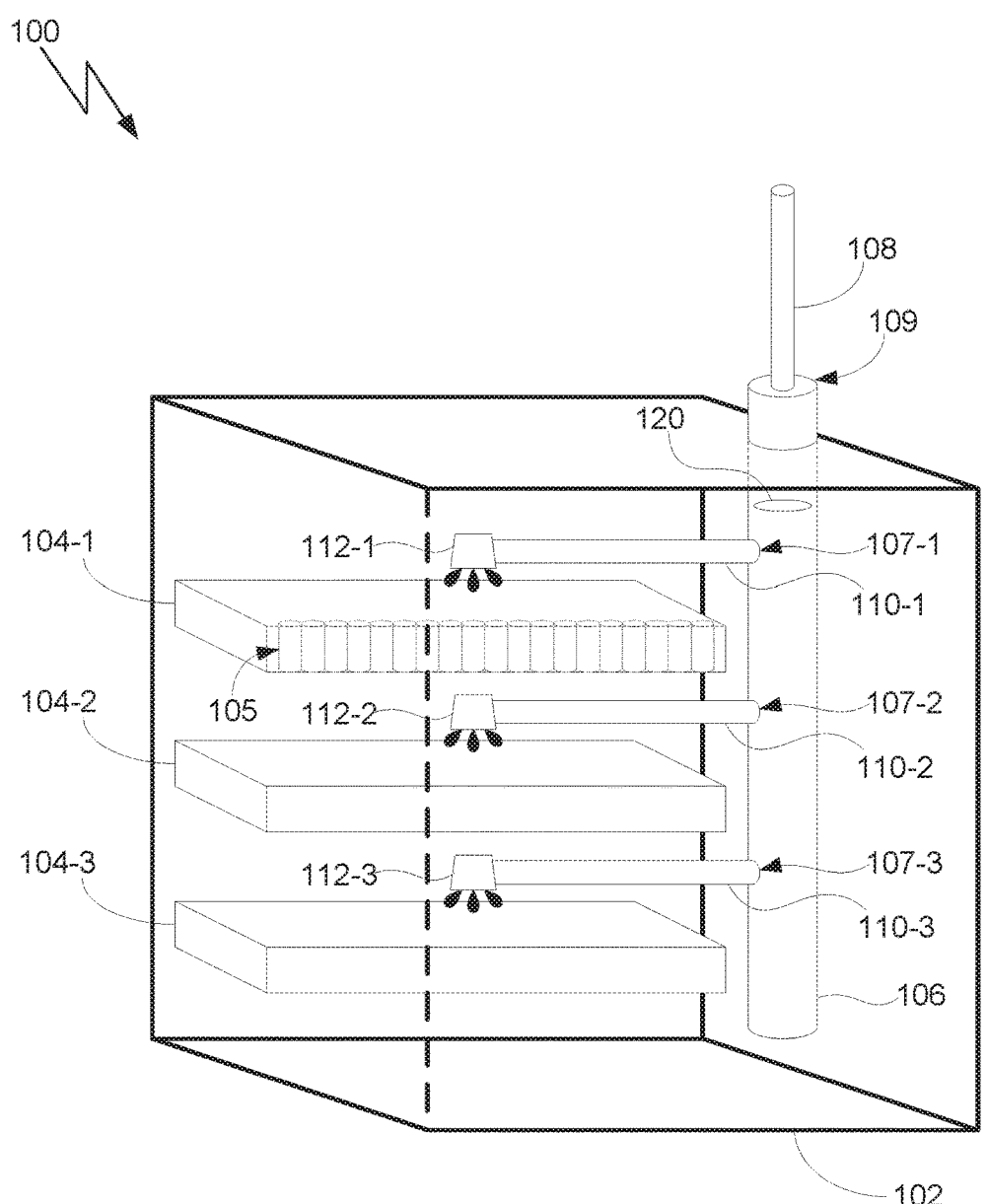
FIG. 1 illustrates a perspective view of a battery rack having a sprinkler manifold, according to various embodiments.

FIG. 1 illustrates a perspective view of a battery rack 100 equipped with a sprinkler manifold, according to various embodiments. Battery rack 100, which may be a part of an energy storage system, includes a cabinet, housing, or other enclosure 102 (hereinafter "cabinet"). Cabinet 102 houses one or more battery modules 104 and various electric components (not shown) for electrically coupling battery modules 104 to an electric grid. While battery rack 100 is shown with three battery modules 104-1 thru 104-3 housed within cabinet 102, a battery rack 100 may include any suitable number of battery modules 104. In various embodiments, a battery rack 100 can include anywhere between one to fourteen battery modules. More generally, the number of battery modules a battery rack can include has no upper limit and can be determined by practical arrangements and size of individual battery modules. A battery module 104 can be mounted within cabinet 102 in any technically feasible manner. For example, cabinet 102 could be a rack-mount cabinet, and battery modules 104 are mounted in cabinet 102 in a manner similar to computer servers mounted in a rack-mount server rack.

A battery module 104 can house one or more battery cells 105 in a housing or other battery module enclosure. Multiple battery cells 105 within a battery module 104 may be electrically arranged in series and/or parallel connections, and may further be arranged in an array-like manner and/or in clusters of battery cells. For example, FIG. 1 shows one of multiple rows of parallel battery cells 105 housed in battery module 104-1. A battery module 104 further includes various electrical components (not shown) for electrically coupling battery cells 105 to the electrical components of cabinet 102. Battery cells 105 can have any technically suitable battery chemistry. In various embodiments, battery cells 104 are lithium-ion cells.

Battery rack 100 further includes a sprinkler manifold 106. In various embodiments, sprinkler manifold 106 is a pipe that extends into the interior of cabinet 102. Sprinkler manifold 106 also has an inflow end 109 that is exposed to the exterior of cabinet 102 and has an opening for fluid flow. A connection tube 108 can couple sprinkler manifold 16 inflow end 109 to a source of water (e.g., an indoor sprinkler or plumbing system, a water tank, an external fire-fighting hook-up activated during fire response) at inflow end 109. In various embodiments, connection tube 108 can be a pipe or a hose as required by local building codes. Alternatively, sprinkler manifold 106 can couple directly to the water source, without a connection tube 108. In some embodiments, sprinkler manifold 106 terminates and is closed in the interior of cabinet 102. As shown in FIG. 1, sprinkler manifold 106 is coupled to connection tube 108 at the inflow end 109, and connection tube 108 would in turn be coupled to a water source (not shown in FIG. 1). Fluid (e.g., water) can flow into sprinkler manifold 106 through the opening at inflow end 109. Further, sprinkler manifold 106 terminates within cabinet 102 at an end opposite of inflow end 109. Sprinkler manifold 106 may be left "dry" (e.g., with or without air pressure), with no water flowing through sprinkler manifold 106 prior to activation of a sprinkler head 112.

Sprinkler manifold 106 includes one or more opening locations 107 along the length of sprinkler manifold 106. Each opening location 107 includes an opening (not shown) through which fluid can flow. A branch pipe 110 can couple to sprinkler manifold 106 at an opening location 107 and receive fluid through the opening at that opening location 107. As shown in FIG. 1, branch pipe 110-1 is coupled to sprinkler manifold 106 at opening location 107-1, branch pipe 110-2 at opening location 107-2, and branch pipe 110-3 at opening location 107-3. In some embodiments, an opening location 107 is sealed to fluid flow when no branch pipe 110 is coupled at that location. For example, an opening location 107 could have a plug-in pipe fitting or coupling, where the opening is unsealed when a branch pipe 110 is plugged into the fitting at that opening location 107 and where the opening is sealed when no branch pipe 110 is plugged in or branch pipe 101 is unplugged from the fitting. Accordingly, individual branch pipes 110 can be plugged in or unplugged without disturbing other branch pipes 110 coupled to sprinkler manifold 106.

In some embodiments, the number of opening locations 107 on sprinkler manifold 106 matches the maximum number of battery module 104 that can be mounted in battery rack 100. Accordingly, when battery rack 100 has the maximum number of mounted battery modules 104, one branch pipe 110 per battery module 104 can be coupled to sprinkler manifold 106.

A branch pipe 110 includes a sprinkler head or other fluid discharge terminal (e.g., nozzle) 112. In various embodiments, sprinkler head 112 is heat-activated, similar to an automatic fire sprinkler. That is, sprinkler head 112 holds back fluid flow via a heat-sensitive sealing mechanism in which the seal breaks at a threshold temperature range (e.g., a temperature rating of sprinkler head 112) to release the blockage. As a temperature of the environment in proximity of sprinkler head 112 increases (e.g., due to heat emitted from a battery module under a thermal runaway event), the sealing mechanism also heats up until the seal breaks at the threshold temperature range. The sealing mechanism may be implemented using any technically feasible technique (e.g. a bulb of liquid that holds the fluid plug in place and expands under heat until the bulb breaks, a valve or plug held by solder that can melt at the threshold temperature range). Once activated, sprinkler head 112 discharges fluid (e.g., water) flowing from branch pipe 110. In various embodiments, the threshold temperature range of the sealing mechanism can be designed and predetermined based on the battery chemistry of battery cells 105 within battery module 104. For example, a branch pipe 110 can be constructed with a sprinkler head 112 that has a temperature rating based on battery chemistry of battery modules 104 that are expected to be mounted in cabinet 102.

As shown, branch pipes 110 coupled to sprinkler manifold 106, and sprinkler heads 112 included with branch pipes 110, are positioned above respective battery modules 104. When activated, sprinkler heads 112 discharge water (e.g., in a spray pattern, free flowing) over respective battery modules 104. For example, sprinkler head 112-1 would discharge fluid over battery module 104-1 when activated. Similarly, sprinkler head 112-2 would discharge fluid over battery module 104-2 and sprinkler head 112-3 would discharge fluid over battery module 104-3. Accordingly, if a battery module 104, for example battery module 104-2, enters into a thermal runaway event, the environment proximate to sprinkler head 112-2 heats up as well from the thermal runaway event. When the temperature at sprinkler head 112-2 reaches the threshold temperature range of sprinkler head 112-2, the seal holding back fluid flow breaks, allowing water to be discharged over battery module 104 via sprinkler head 112-2.

In some embodiments, sprinkler manifold 106 includes a flow detector or sensor (e.g., a flowmeter) 120, which detects fluid flow in and/or through sprinkler manifold 106. For example, when one or more of sprinkler heads 112 discharge water, flow detector 120 detects flow of water through sprinkler manifold 106 toward sprinkler heads 112. In some embodiments, flow detector 120 is communicatively coupled to a computing system, a fire alarm system, and/or a monitoring system. Flow detector 120 can signal detected fluid flow to the computing system, fire alarm system, and/or monitoring system to trigger additional functionality, including but not limited to de-energizing a battery cell 105, a battery module 104, battery rack 100 or the energy storage system, activating a fire alarm system, sending a signal to a monitoring system, etc. For example, the computing system could determine whether the fluid flow through sprinkler manifold 106, as detected by flow detector 120, is above a threshold. When the fluid flow is above the threshold, the computer system would determine that a thermal runaway and/or fire event associated with battery rack 100 is occurring. Based on the determination that a thermal runaway and/or fire event is occurring, the computing system could de-energize battery rack 100.

Figure 2:
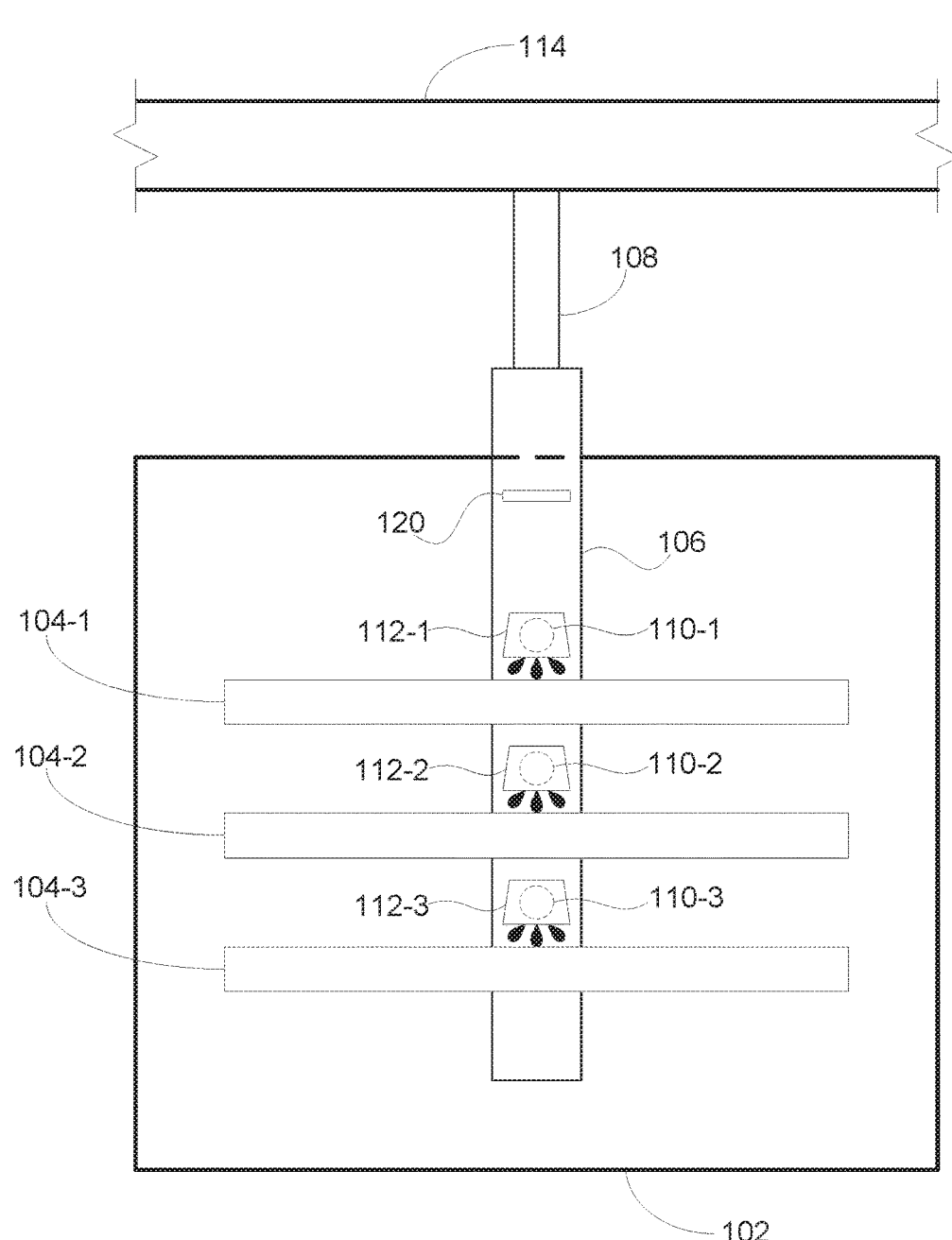
FIG. 2 illustrates a front view of the battery rack of FIG. 1, according to various embodiments.
Figure 3:
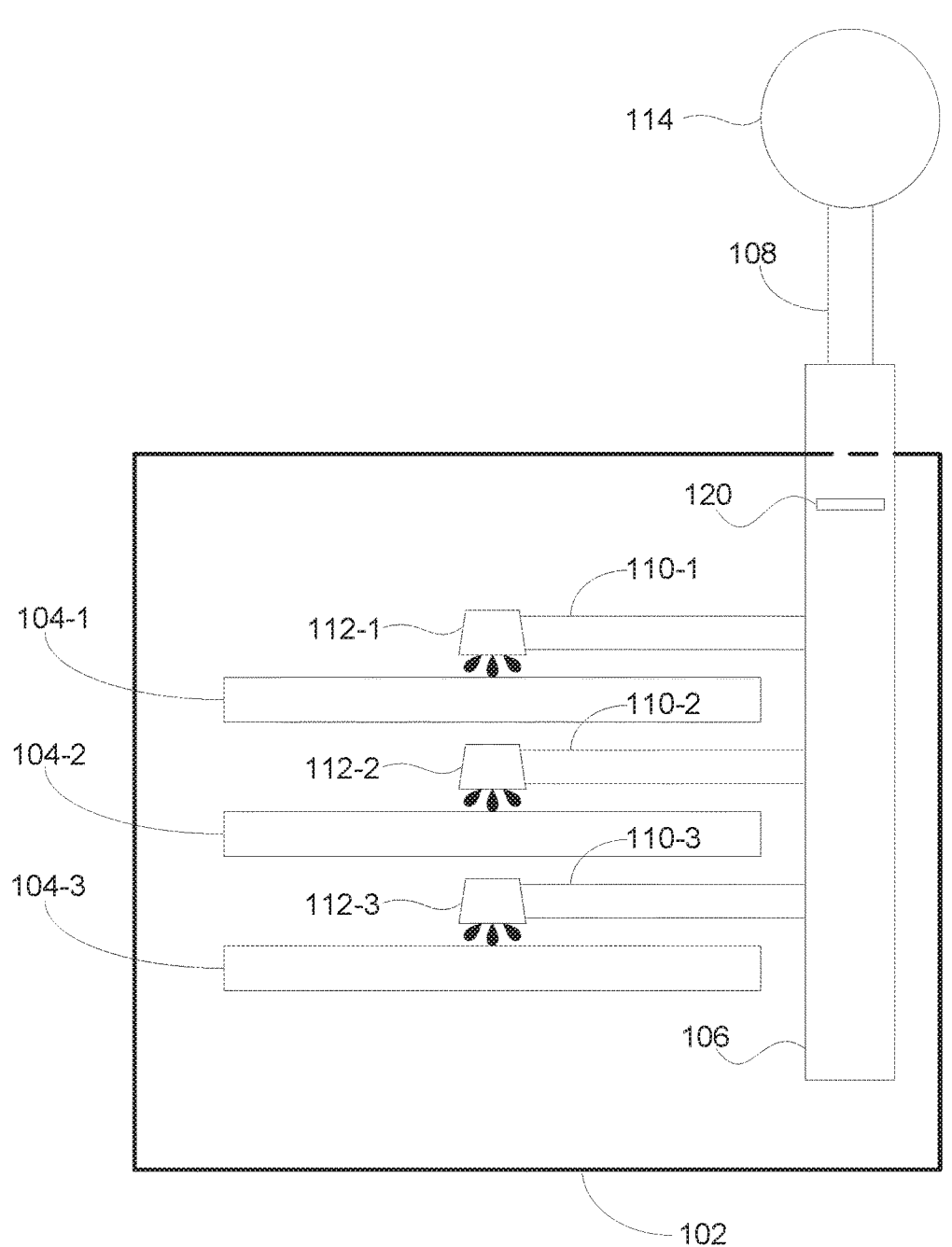
FIG. 3 illustrates a side view of the battery rack of FIG. 1, according to various embodiments.

FIG. 2 illustrates a front view of battery rack 100 and FIG. 3 illustrates a side view of battery rack 100, according to various embodiments. FIGS. 2-3 illustrate battery rack 100 that is installed (e.g., placed alongside a wall) and whose sprinkler manifold 106 is coupled to a water source. As shown, sprinkler manifold 106 is coupled to a water pipe 114 via connection tube 108. Water pipe 114 may be a part of a fire suppression sprinkler system or other plumbing system that supplies water to sprinkler manifold 106 and branch pipes 110. Water can flow from pipe 114 into sprinkler manifold 106 via connection tube 108. The water can fill sprinkler manifold 106 and flow into branch pipes 110-1 thru 110-3. The water further can fill branch pipes 110 and through activated sprinkler heads 112-1 thru 112-3 for discharge over battery modules 104-1 thru 104-3, respectively.

While sprinkler manifold 106 is shown as being approximately centered along one vertical side of cabinet 102, it should be appreciated that sprinkler manifold 106 can be located in any suitable location within cabinet 102 (e.g., along a corner, along a vertical side, through the center axis). Further, while sprinkler heads 112 are shown as being positioned above their corresponding battery modules, in some embodiments, sprinkler heads are positioned below or to the side of their corresponding battery modules. For example, a sprinkler head positioned under its corresponding battery module would spray water upward to the bottom of its corresponding battery module.

In various embodiments, sprinkler manifold 106, branch pipes 110, and sprinkler heads 112 can be designed and/or tested in conjunction with battery rack 100 prior to implementation. For example, a battery rack could be designed to support a sprinkler manifold and branch pipes, and conversely a sprinkler manifold and branch pipes could be designed for implementation in certain battery racks. Further, a sprinkler manifold and branch pipes can be tested at the design and/or manufacturing stage in conjunction with a battery rack and battery modules mounted within. Even further, sprinkler heads could be designed and/or tested for optimal thermal runaway suppression (e.g., optimizing the water discharge pattern, optimizing the threshold temperature) in conjunction with a battery rack and/or battery modules mounted within (e.g., customizing the sprinkler heads to the battery chemistry, thermal properties, and construction of the battery modules). For example, the threshold temperature range for activating the sprinkler head could be customized or configured based on the battery chemistry, thermal properties, and/or construction of the battery module(s). By facilitating design and testing of sprinkler manifolds, branch pipes, and sprinkler heads in conjunction with the design and construction of battery racks and battery modules prior to implementation, those components can be designed to conform to existing water sources (e.g., sprinkler systems and associated water flow rates that follow current regulations) and thus reduce or eliminate extensive upgrades to water sources in order to support a sprinkler manifold and associated components.

Figure 4:
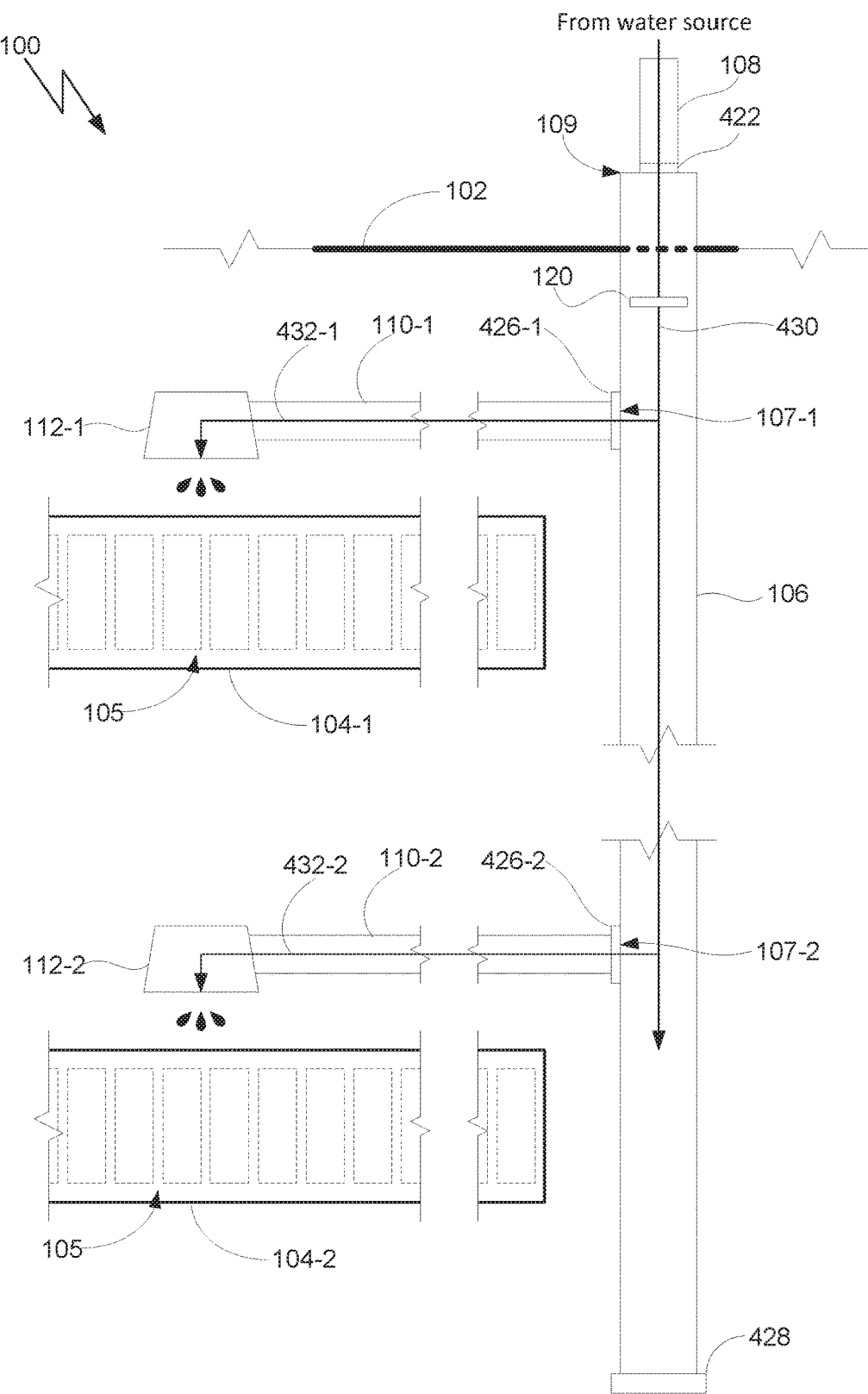
FIG. 4 illustrates a detailed side view of the battery rack of FIG. 1, according to various embodiments.

FIG. 4 illustrates a detailed side view of a battery rack 100, according to various embodiments. As shown, battery rack 100 includes a sprinkler manifold pipe 106 and battery modules 104-1 and 104-2. Battery module 104-1 is mounted at one mounting location within battery rack 100, and battery module 104-2 is mounted at another mounting location within battery rack 100. Battery modules 104 hold battery cells 105. Sprinkler manifold pipe 106 extends from the exterior of cabinet 102 into the interior of cabinet 102, where sprinkler manifold pipe 106 is sealed at terminal 428. Sprinkler manifold pipe 106 includes a fitting or coupling 422 at inflow end 109 for coupling to a connection tube 108 or directly to a water source (e.g., sprinkler system, plumbing system, water tank). Fitting 422 can couple sprinkler manifold pipe 106 to a connection tube 108 or to a water source in any technically feasible manner. For example, fittings 422 could be, for example and without limitation, a threaded fitting or a plug-in fitting.

Sprinkler manifold pipe 106 includes opening locations 107-1 and 107-2 through which fluid (e.g., water) can flow. Sprinkler manifold pipe 106 also includes branch pipe fittings or couplings 426-1 and 426-2 corresponding to opening locations 107-1 and 107-2, respectively. A branch pipe 110 can couple to sprinkler manifold pipe 106 at a branch pipe fitting 426. Similar to fitting 422, a fitting 426 can couple a branch pipe 110 to sprinkler manifold pipe 106 in any technically feasible manner. Fitting 426 can be, for example, a threaded fitting or a plug-in fitting. In some embodiments, fitting 426 can include a valve or the like that blocks fluid flow through the corresponding opening location 107 when a branch pipe 110 is not coupled to fitting 426. Fastening (e.g., via the threading, plugging in) a branch pipe 110 to fitting 426 causes the value to open and the valve remains open while branch pipe 110 is fastened, thereby allowing fluid flow through the corresponding opening location 107. In some embodiments, sprinkler manifold 106 also includes a flow detector 120.

Branch pipes 110 also include respective sprinkler heads 112, each configured to discharge fluid over a battery module mounting location where a battery module 104 can be mounted. For example, sprinkler head 112-1 can spray water over the location where battery module 104-1 is mounted, and sprinkler head 112-2 can spray water over the location where battery module 104-2 is mounted. With battery modules 104-1 and 104-2 mounted at their respective locations, sprinkler heads 112-1 and 112-2 discharges water over battery modules 104-1 and 104-2, respectively. A sprinkler head 112 can be activated by heat from the environment within cabinet 102 (e.g., heat emitted from battery cells 105 within battery modules 104) causing the temperature of sprinkler head 112 to increase to a threshold temperature range at which a fluid blockage in sprinkler head 112 can break.

While FIG. 4 shows each branch pipe 110 having one sprinkler head 112 at the terminal of the branch pipe 110, in some embodiments, a branch pipe 110 can have multiple sprinkler heads distributed throughout the length of branch pipe 110, each of which is configured to discharge fluid over the corresponding battery module mounting location.

In operation, water flows from the water source into sprinkler manifold pipe 106, as indicated by arrow 430. As the water fills sprinkler manifold pipe 106, the water can flow into and fill branch pipes 426 through respective opening locations 107, as indicated by arrows 432-1 and 432-2. A sprinkler head 112 blocks further flow of the fluid through the corresponding branch pipe 110 until that sprinkler head 112 is activated by heat. When activated, a sprinkler head 112 allows the water to flow through and discharges the water over the corresponding battery module 104.

In embodiments where the water source is a fire suppression sprinkler system, battery rack 100 can be implemented in conjunction with a wet sprinkler system or a dry sprinkler system. In embodiments where the water source is a wet sprinkler system, water from the sprinkler system can flow into and fill sprinkler manifold pipe 106 and branch pipes 110. The water is blocked from further flow by not-activated sprinkler heads 112. When one or more sprinkler heads 112 are activated, the activated sprinkler heads 112 discharge water, and further water is drawn in from the sprinkler system into sprinkler manifold pipe 106 and branch pipes 110 whose sprinkler heads 112 has activated.

In embodiments where the water source is a dry sprinkler system, pressurized air can fill sprinkler manifold pipe 106 and branch pipes 110. The air is blocked from further flow by not-activated sprinkler heads 112. Meanwhile, the sprinkler system holds water that can flow into sprinkler manifold pipe 106. When one or more sprinkler heads 112 are activated, the compressed air vents through the activated sprinkler heads 112. The venting of air causes a decrease in air pressure within sprinkler manifold pipe 106, which then causes the water from the sprinkler system to flow into sprinkler manifold pipe 106 and branch pipes 110 (e.g., the decrease in air pressure causes an valve in the sprinkler system holding back the pressurized water to open). Water from the sprinkler system can flow into branch pipes 110 and be discharged through activated sprinkler heads 112. Further water from the sprinkler system can flow into sprinkler manifold pipe 106 and branch pipes 110 whose sprinkler heads 112 has activated.

Figure 5:
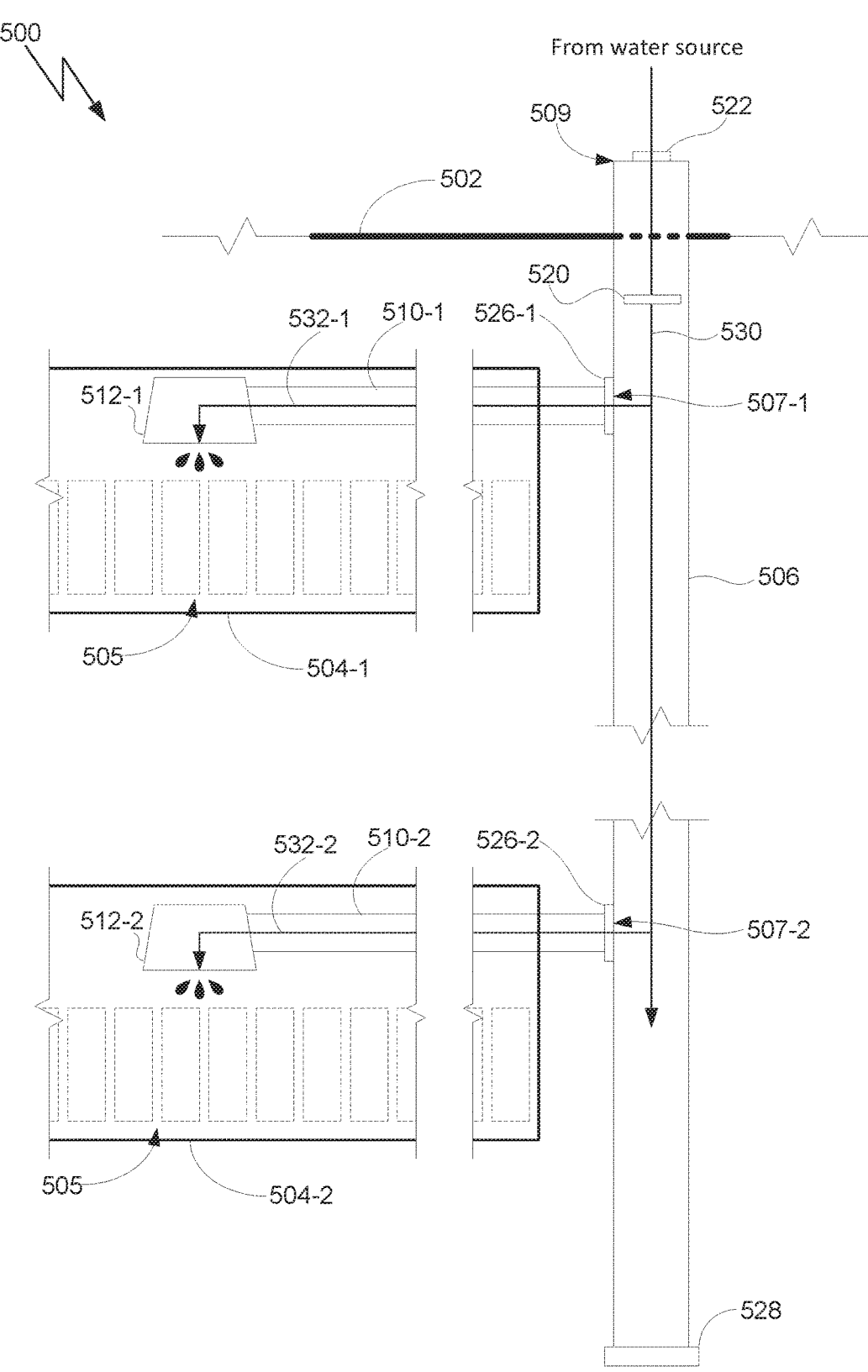
FIG. 5 illustrates a detailed side view of a battery rack having a sprinkler manifold and branch pipes that extend into battery modules, according to various embodiments.

FIG. 5 illustrates a detailed side view of a battery rack 500 having a sprinkler manifold and branch pipes that extend battery modules, according to various embodiments. While FIGS. 1-4 illustrate branch pipes (e.g., branch pipes 110) as separate from battery modules, in some embodiments, a branch pipe can be integrated with (e.g., extend into) a battery module. As shown in FIG. 5, battery rack 500 includes a sprinkler manifold pipe 506 and battery modules 504-1 and 504-2. Battery rack 500 and the components illustrated in FIG. 5 are in many ways similar to battery rack 100 and associated components illustrated in FIGS. 1-4, except as described below. Battery modules 504 hold battery cells 505. Sprinkler manifold pipe 506 extends from the exterior of cabinet 502 into the interior of cabinet 502, where sprinkler manifold pipe 506 is sealed at terminal 528. Sprinkler manifold pipe 506 includes a fitting or coupling 522 at inflow end 509 for coupling to a connection tube (not shown) or directly to a water source (e.g., sprinkler system, plumbing system, water tank). Fitting 522 can couple sprinkler manifold pipe 506 to a connection tube or to a water source in any technically feasible manner.

Sprinkler manifold pipe 506 includes opening locations 507-1 and 507-2 through which fluid (e.g., water) can flow. Sprinkler manifold pipe 506 also includes branch pipe fittings or coupling 526-1 and 526-2 corresponding to opening locations 507-1 and 507-2, respectively. A branch pipe 510 can couple to sprinkler manifold pipe 506 at a branch pipe fitting 526. Similar to fitting 522, a fitting 526 can couple a branch pipe 510 to sprinkler manifold pipe 506 in any technically feasible manner, including for example a quick-disconnect coupling. In some embodiments, fitting 526 can include a valve or the like that blocks fluid flow through the corresponding opening location 507 when a branch pipe 510 is not coupled to fitting 526. Fastening (e.g., via the threading, plugging in) a branch pipe 510 to fitting 526 causes the value to open and the valve remains open while branch pipe 510 is fastened, thereby allowing fluid flow through the corresponding opening location 507. In some embodiments, sprinkler manifold 506 also includes a flow detector or sensor 520.

As shown, branch pipes 510 are integrated with respective battery modules. For example, branch pipe 510-1 is integrated with battery module 504-1, and branch pipe 510-2 is integrated with battery module 504-2. A portion of branch pipe 510 extends out of battery module 504 and can couple to sprinkler manifold 506 via fitting 526. The remainder of branch pipe 510 is located within battery module 504. A sprinkler head 512 is coupled to the portion of branch pipe 510 that is within battery module 504.

As described above, branch pipes 510 also include respective sprinkler heads 512. Sprinkler heads 512 are configured to discharge fluid over battery cells 505 within battery modules 504. For example, sprinkler head 512-1 can spray water over battery cells 505 within battery module 504-1, and sprinkler head 512-2 can spray water over battery cells 505 within battery module 504-2. A sprinkler head 512 is activated by heat from the environment within cabinet 502 (e.g., heat emitted from battery cells 505 within battery modules 504) causing the temperature of sprinkler head 512 to increase to a threshold temperature, at which a fluid blockage in sprinkler head 512 to break.

While FIG. 5 shows each branch pipe 510 having one sprinkler head 512 at the terminal of the branch pipe 510, in some embodiments, a branch pipe 510 can have multiple sprinkler heads distributed throughout the length of the portion of branch pipe 510 within battery module 504, each of which is configured to discharge fluid over battery cells held within the battery module.

In operation, water flows from the water source into sprinkler manifold pipe 506, as indicated by arrow 530. As the water fills sprinkler manifold pipe 506, the water can flow into and fill branch pipes 526 through respective opening locations 507, as indicated by arrows 532-1 and 532-2. A sprinkler head 512 blocks further flow of the fluid through the corresponding branch pipe 510 until that sprinkler head 512 is activated by heat. When activated, a sprinkler head 512 allows the water to flow through and discharges the water over battery cells within the corresponding battery module 504.

Similar to battery rack 100, battery rack 500 can be implemented in conjunction with a wet or dry sprinkler system. Accordingly, depending on the implementation, sprinkler manifold pipe 506 and branch pipes 510 can be filled with water or pressurized or unpressurized air prior to activation of sprinkler heads 512.

Figure 6:
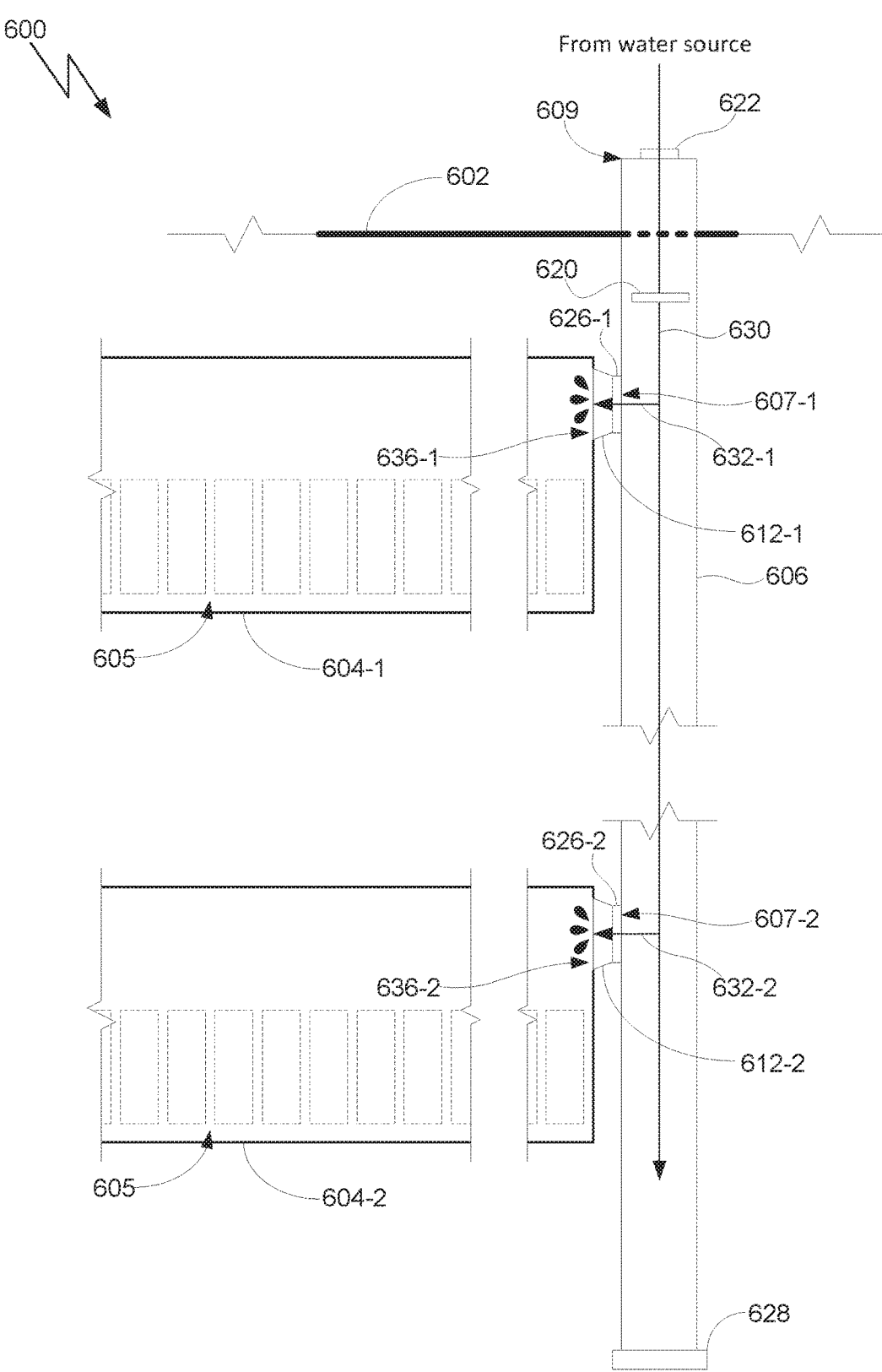
FIG. 6 illustrates a detailed side view of a battery rack having a sprinkler manifold with heat-activated fluid discharge terminals mounted directly to the sprinkler manifold, according to various embodiments.

FIG. 6 illustrates a detailed side view of a battery rack 600 having a sprinkler manifold with heat-activated fluid discharge terminals mounted directly to the sprinkler manifold, according to various embodiments. In some embodiments, sprinkler heads or fluid discharge terminals can couple to the sprinkler manifold without branch pipes, and the sprinkler heads discharge fluid into battery modules. As shown in FIG. 6, battery rack 600 includes a sprinkler manifold pipe 606 and battery modules 604-1 and 604-2. Battery rack 600 and the components illustrated in FIG. 6 are in many ways similar to battery rack 500 and associated components illustrated in FIGS. 1-5, except as described below. Battery modules 604 hold battery cells 605. Sprinkler manifold pipe 606 extends from the exterior of cabinet 602 into the interior of cabinet 602, where sprinkler manifold pipe 606 is sealed at terminal 628. Sprinkler manifold pipe 606 includes a fitting or coupling 622 at inflow end 609 for coupling to a connection tube (not shown) or directly to a water source (e.g., sprinkler system, plumbing system, water tank). Fitting 622 can couple sprinkler manifold pipe 606 to a connection tube or to a water source in any technically feasible manner.

Sprinkler manifold pipe 606 includes opening locations 607-1 and 607-2 through which fluid (e.g., water) can flow. Sprinkler manifold pipe 606 also includes fittings or couplings 626-1 and 626-2 corresponding to opening locations 607-1 and 607-2, respectively. A sprinkler head or fluid discharge terminal 612 can couple to sprinkler manifold pipe 606 at a fitting 626. Similar to fitting 622, a fitting 626 can couple a sprinkler head 612 to sprinkler manifold pipe 606 in any technically feasible manner, including for example a quick-disconnect coupling. In some embodiments, fitting 626 can include a valve or the like that blocks fluid flow through the corresponding opening location 607 when a sprinkler head 612 is not coupled to fitting 626. Fastening (e.g., via the threading, plugging in) a sprinkler head 612 to fitting 626 causes the value to open and the valve remains open while sprinkler head 612 is fastened, thereby allowing fluid flow through the corresponding opening location 607. In some embodiments, sprinkler manifold 606 also includes a flow detector or sensor 620.

As described above, sprinkler heads 612 are coupled to sprinkler manifold pipe 606. Sprinkler heads 512 are configured to discharge fluid into battery modules 604 through openings 636 on side walls of the enclosures or housings of battery modules 604. An opening 636 can fit onto a sprinkler head 612. For example, opening 636-1 of battery module 604-1 would fit onto sprinkler head 612-1, and sprinkler head 612-1 could discharge water into battery module 604-1 through opening 636-1. Opening 636-2 of battery module 604-2 would fit onto sprinkler head 612-2, and sprinkler head 612-2 could discharge water into battery module 604-2 through opening 636-2. A sprinkler head 612 is activated by heat from the environment within cabinet 602 (e.g., heat emitted from battery cells 605 within battery modules 604) causing the temperature of sprinkler head 612 to increase to a threshold temperature, at which a fluid blockage in sprinkler head 612 to break.

While FIG. 6 shows sprinkler heads 612 coupled to sprinkler manifold pipe 606 without branch pipes, alternatively branch pipes of minimal length could be coupled to sprinkler manifold pipe 606 and sprinkler heads 612 coupled to the branch pipes, similar to FIG. 5 but with branch pipes shortened. Further, in some embodiments, opening 636 need not fit onto a sprinkler head 612; there can be a gap between the end of a sprinkler head 612 and opening 636 of the corresponding battery module 604.

In operation, in case of a fire inside a battery module 604, hot gases associated with the fire can escape through an opening 636 of battery module 604. Those hot gases will be sufficiently hot to activate a corresponding sprinkler head 612. Water flows from the water source into sprinkler manifold pipe 606, as indicated by arrow 630, and into sprinkler heads 612, as indicated by arrows 632. An activated sprinkler head 612 discharges water directly into the housing of battery module 604 through opening 636. For example, sprinkler head 612-1 would spray water into battery module 604-1 through opening 636-1, and sprinkler head 612-2 would spray water into battery module 604-2 through opening 636-2. The shape of the enclosure of battery module 604 can contain the water within and progressively start cooling and flooding battery cells 605 within battery module 604 from the bottom.

Similar to battery rack 100, battery rack 600 can be implemented in conjunction with a wet or dry sprinkler system. Accordingly, depending on the implementation, sprinkler manifold pipe 606 can be filled with water or pressurized or unpressurized air prior to activation of sprinkler heads 612.

While FIGS. 1-6 show sprinkler manifold pipes that terminate within the cabinet of the battery rack, in some embodiments the sprinkler manifold pipe has inflow and outflow ends and can extend to the exterior of the cabinet of the battery rack at both inflow and outflow ends. Both inflow and outflow ends could be coupled to a water source or water system (e.g., an indoor plumbing system). Additionally, the sprinkler manifold pipe can have an inflow opening location and an outflow opening location per branch pipe, and ends of a branch pipe would couple to the sprinkler manifold pipe at the inflow opening location and the outflow opening location. Such a branch pipe can have one or more heat-activated sprinkler heads along the length of the branch pipe. Accordingly, water from the water source (e.g., an indoor plumbing system) can continuously circulate into the sprinkler manifold pipe and into the branch pipes, and then back out of branch pipes into the sprinkler manifold pipe, and back out of the sprinkler manifold pipe to the water source or system. In embodiments where these branch pipes extend into battery modules and are in contact with battery cells, water circulating through these branch pipes and the sprinkler manifold can provide passive cooling capabilities to battery modules, as well as discharging water when sprinkler heads are activated.

It should be appreciated that each sprinkler head activates independently based on the temperature at the sprinkler head. Accordingly, for example, in FIG. 4 sprinkler head 112-2 can activate (e.g., due to the heat from a thermal runaway event occurring at battery module 104-2) and discharge water, while sprinkler head 112-1 remains not activated (e.g., no thermal runaway event at battery module 104-1 yet and thus the temperature at sprinkler head 112-1 is lower). This individual activation capability reduces collateral damage (e.g., damage to other battery modules in the battery rack that has yet to enter into a thermal runaway or has yet to ignite) in the event of a thermal runaway or fire inside a single module.

Further, it should be appreciated that while the disclosed embodiments are described above with reference to water as the fluid, the disclosed embodiments can be adapted to transport and discharge any fluid, whether gas or liquid. For example, other gases or liquids, besides water, that are effective in suppressing thermal runaway events could be used in conjunction with the disclosed embodiments.

In sum, a fluid delivery system can deliver fluid, such as water, to battery modules within a battery rack. The fluid delivery system includes a manifold pipe that extends into the cabinet of the battery rack and can be coupled to a fluid source (e.g., a sprinkler system, a static or mobile water tank). One or more heat-activated sprinkler heads or other similar fluid discharge terminals are coupled to the manifold pipe directly or via branch pipes of as-required length coupled to the manifold pipe. Branch pipes and sprinkler heads can receive fluid from the manifold pipe. In operation, when a sprinkler head activates at a threshold temperature range (e.g., due to a thermal runaway or fire at a battery module, due to a fire outside of the battery rack), water flows from the sprinkler manifold into the sprinkler head and the activated sprinkler head discharges the water over the battery module to decrease the temperature and suppress any fire at the battery module. In some embodiments, sprinkler heads can discharge water into the enclosure of the battery module, thus facilitating discharge of fluid directly to battery cells within the battery module.

One technical advantage of the disclosed design relative to the prior art is that the disclosed design can deliver water directly to battery modules mounted within a battery rack. Accordingly, the disclosed techniques and systems are more effective at extinguishing fires involving battery modules within a battery rack compared to conventional techniques. Another technical advantage of the disclosed design relative to the prior art is that the disclosed design places heat-activated sprinkler heads closer to the battery modules that can emit heat when under thermal runaway. Accordingly, activation of the sprinkler heads, and correspondingly water discharge from the sprinkler heads, are more responsive to thermal runaway events that occur at battery cells and battery modules compared to conventional techniques and can reduce the occurrence of ignition and fire propagation due to a thermal runaway event. A further technical advantage of the disclosed design is that the disclosed design does not require significant upgrades to be made to a sprinkler system in order to implement the disclosed design. Yet another technical advantage of the disclosed design is that the disclosed design enables individual activation of sprinkler heads responsive to thermal conditions within the battery rack. Accordingly, collateral damage, due to water or smoke damage, to battery modules, battery racks, power conversion hardware, and portions of the facility yet to be reached by the thermal runaway and/or fire is reduced. These technical advantages provide one more technological improvements over prior art designs and approaches.

1. In some embodiments, a system comprises a housing configured to mount one or more battery modules in an interior of the housing; a manifold pipe; and a fluid discharge terminal coupled to the manifold pipe, wherein the fluid discharge terminal is configured to receive fluid flowing from the manifold pipe and discharge fluid to a first mounting location in the interior of the housing.

2. The system of clause 1, wherein the manifold pipe comprises a terminal end located in the interior of the housing.

3. The system of clauses 1 or 2, wherein the manifold pipe comprises an open end located in the exterior the housing.

4. The system of any of clauses 1-3, wherein the manifold pipe is configured to couple to a fluid source via the open end and to receive fluid from the fluid source via the open end.

5. The system of any of clauses 1-4, further comprising a branch pipe that is coupled to the manifold pipe and is configured to receive fluid flowing from the manifold pipe.

6. The system of any of clauses 1-5, wherein the fluid discharge terminal is coupled to the manifold pipe via the branch pipe, and the branch pipe is configured to direct water received from the manifold pipe to the fluid discharge terminal.

7. The system of any of clauses 1-6, wherein the fluid discharge terminal is configured to activate at a threshold temperature to discharge fluid.

8. The system of any of clauses 1-7, wherein the manifold pipe comprises one or more openings distinct from the open end, and wherein the fluid discharge terminal is coupled to the manifold pipe at an opening included in the one or more openings.

9. The system of any of clauses 1-8, comprising a first battery module mounted in the interior of the housing at the first mounting location.

10. The system of any of clauses 1-9, further comprising a second fluid discharge terminal coupled to the manifold pipe, wherein the second fluid discharge terminal is configured to receive fluid flowing from the manifold pipe and discharge fluid to a second mounting location in the interior of the housing.

11. In some embodiments, an energy storage apparatus comprises a housing configured to mount one or more battery modules in an interior of the housing; a battery module mounted in the interior of the housing; a manifold pipe extending into the interior of the housing; and a fluid discharge terminal coupled to the manifold pipe and configured to discharge fluid flowing from the manifold pipe to the battery module.

12. The energy storage apparatus of clause 11, wherein the manifold pipe is configured to couple to a fluid source via a first end and to receive fluid from the fluid source via the first end.

13. The energy storage apparatus of clauses 11 or 12, wherein the fluid discharge terminal is configured to discharge fluid within the battery module.

14. The energy storage apparatus of any of clauses 11-13, further comprising a branch pipe that is coupled to the manifold pipe, wherein the fluid discharge terminal is coupled to the manifold pipe via the branch pipe.

15. The energy storage apparatus of any of clauses 11-14, further comprising a second fluid discharge terminal coupled to the branch pipe, wherein the second fluid discharge terminal is configured to discharge fluid to or within the battery module.

16. The energy storage apparatus of any of clauses 11-15, wherein the branch pipe is integrated with the battery module.

17. The energy storage apparatus of any of clauses 11-16, wherein the fluid discharge terminal is configured to activate at a threshold temperature range to discharge fluid.

18. The energy storage apparatus of any of clauses 11-17, wherein the threshold temperature range of the fluid discharge terminal is configured based on at least one of a battery chemistry and thermal properties associated with the battery module.

19. The energy storage apparatus of any of clauses 11-18, further comprising a second battery module mounted in the interior of the housing; and a second fluid discharge terminal coupled to the manifold pipe and configured to discharge fluid flowing from the manifold pipe to or within the second battery module.

20. The energy storage apparatus of any of clauses 11-19, further comprising a sensor configured to detect fluid flow in the manifold pipe.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, apparatus, or device. In addition, any element, component, module, or system described in the present disclosure may be implemented as a combination of sub-components or sub-elements.

Aspects of the present disclosure are described above with reference to illustrations of apparatus (systems) according to embodiments of the disclosure. The illustrations in the figures illustrate the architecture, functionality, and operation of possible implementations of systems, apparatuses, and devices according to various embodiments of the present disclosure. In this regard, each element of the systems, apparatuses, or devices that are shown in the illustrations may represent a module or component for implementing the specified functionality. It should also be noted that, in some alternative implementations, the described elements of the systems, apparatuses, or devices may be arranged in a different physical arrangement than as shown in the figures.

While the preceding is directed to embodiments of the present disclosure, other and further embodiments of the disclosure may be devised without departing from the basic scope thereof, and the scope thereof is determined by the claims that follow.

What is claimed is:

1. An energy storage apparatus, comprising:
a housing configured to mount a plurality of battery modules within an interior of the housing;
a first battery module included in the plurality of battery modules mounted in the housing, the first battery module comprising a battery casing enclosing a plurality of cells, the battery casing consisting of a casing and a single opening, wherein the single opening is on a side of the casing that faces a vertical side of the housing; and a sprinkler manifold including:
a manifold pipe extending vertically along the vertical side of the housing from an inflow end outside an exterior of the housing into the interior of the housing and terminating within the housing opposite the inflow end, wherein the inflow end is capable of being coupled to:
a fluid source, or
a connection tube that couples the sprinkler manifold to the fluid source;
a fluid discharge terminal that is directly coupled to the manifold pipe at an opening location of the manifold pipe and extends perpendicular to the manifold pipe towards the single opening of the battery casing of the first battery module, wherein the fluid discharge terminal is configured to discharge a fluid flowing from the manifold pipe into the single opening of the battery casing of the first battery module, wherein there is a gap between the fluid discharge terminal and the single opening of the battery casing of the first battery module.

2. The energy storage apparatus of claim 1, further comprising a second battery module mounted in the housing, wherein the sprinkler manifold further comprises:
a second fluid discharge terminal that is directly coupled to the manifold pipe at a second opening location and extends towards the second battery module, wherein the second fluid discharge terminal is configured to discharge the fluid to or within the second battery module.

3. The energy storage apparatus of claim 1, wherein the fluid discharge terminal is configured to activate at a threshold temperature range to discharge the fluid.

4. The energy storage apparatus of claim 3, wherein the threshold temperature range of the fluid discharge terminal is configured based on at least one of a battery chemistry or thermal properties associated with the first battery module.

5. The energy storage apparatus of claim 1, wherein:
the sprinkler manifold further comprises a sensor communicatively coupled to a computing system, the sensor detecting a fluid flow of the fluid in the sprinkler manifold and signaling the fluid flow to the computing system configured to detect a thermal runaway event; and
the first battery module is de-energized in response to the computing system detecting the thermal runaway event.

6. The energy storage apparatus of claim 1, wherein the sprinkler manifold further comprises a sensor communicatively coupled to a computing system, the sensor detecting a fluid flow of the fluid in the sprinkler manifold and signaling the fluid flow to the computing system to trigger additional functionality.

7. The energy storage apparatus of claim 6, wherein the additional functionality includes detecting a thermal runaway event when the fluid flow exceeds a threshold.

8. The energy storage apparatus of claim 7, wherein the additional functionality further includes de-energizing the first battery module in response to detecting the thermal runaway event.

* * * * *